(12) United States Patent
Seong et al.

(10) Patent No.: US 10,140,031 B2
(45) Date of Patent: Nov. 27, 2018

(54) HIERARCHICAL FLASH TRANSLATION LAYER STRUCTURE AND METHOD FOR DESIGNING THE SAME

(71) Applicant: FADU Inc., Seoul (KR)

(72) Inventors: Yoon Jae Seong, Seoul (KR); Eyee Hyun Nam, Seoul (KR); Hongseok Kim, Seoul (KR); Jin-yong Choi, Gyeonggi-do (KR); Sunggab Lee, Gyeonggi-do (KR); Kijun Kim, Seoul (KR)

(73) Assignee: FADU Inc., Seoul (KR)

( * ) Notice: Subject to any disclaimer, the term of this patent is extended or adjusted under 35 U.S.C. 154(b) by 232 days.

(21) Appl. No.: 15/334,663

(22) Filed: Oct. 26, 2016

(65) Prior Publication Data

US 2018/0004428 A1     Jan. 4, 2018

(30) Foreign Application Priority Data

Jun. 29, 2016    (KR) ........................ 10-2016-0081508

(51) Int. Cl.
| | |
|---|---|
| *G06F 12/02* | (2006.01) |
| *G06F 3/06* | (2006.01) |
| *G06F 12/128* | (2016.01) |
| *G06F 12/0804* | (2016.01) |
| *G06F 12/0868* | (2016.01) |

(52) U.S. Cl.
CPC .......... *G06F 3/0611* (2013.01); *G06F 3/0655* (2013.01); *G06F 3/0688* (2013.01); *G06F 12/0246* (2013.01); *G06F 12/0804* (2013.01); *G06F 12/0868* (2013.01); *G06F 12/128* (2013.01); *G06F 2212/1016* (2013.01); *G06F 2212/1048* (2013.01); *G06F 2212/461* (2013.01); *G06F 2212/466* (2013.01); *G06F 2212/7201* (2013.01)

(58) Field of Classification Search
CPC ............................................... G06F 2212/7201
See application file for complete search history.

(56) References Cited

FOREIGN PATENT DOCUMENTS

| | | | |
|---|---|---|---|
| KR | 2013-0108967 | 10/2013 | ............. G06F 13/14 |
| KR | 2014-0100907 | 8/2014 | ............. G06F 11/07 |

*Primary Examiner* — Jared I Rutz
*Assistant Examiner* — Hannah A Faye-Joyner
(74) *Attorney, Agent, or Firm* — Harness, Dickey & Pierce, P.L.C.

(57) ABSTRACT

A Flash Translation Layer (FTL) structure including mapping information for storing data is disclosed. The FTL structure includes a plurality of hierarchical data groups including a zeroth-layer host data group, and first-layer to $n^{th}$-layer metadata groups, and zeroth to $n^{th}$ logs configured in a hierarchical structure in correspondence with the respective hierarchical data groups, for processing data of the corresponding data groups. A $k^{th}$ log ($0 \le k \le n$) provides an interface to volatile memory resources dividedly allocated to the $k^{th}$ log, an interface to non-volatile memory resources dividedly allocated to the $k^{th}$ log, and an interface to at least one of $(k-1)^{th}$ and $(k+1)^{th}$ logs.

14 Claims, 10 Drawing Sheets

HIERARCHICAL FLASH TRANSLATION LAYER STRUCTURE AND METHOD FOR DESIGNING THE SAME

CROSS-REFERENCE TO RELATED APPLICATIONS

This application claims the benefit and priority of Korean Patent Application No. 10-2016-0081508 filed on Jun. 29, 2016. The entire disclosure of the above application is incorporated herein by references.

FIELD

The present invention relates to a Flash Translation Layer (FTL) structure and a method for designing the same, and more particularly, to implementation of an FTL with hierarchical data groups, logs that manage the data groups, and hierarchical interaction between the logs.

BACKGROUND

Recently, flash memory has rapidly substituted for Hard Disk Drive (HDD) and extended its use from the market of consumer appliances (e.g., laptop and desktop computers) to the fields of business servers and data centers. Unlike the HDD, the flash memory does not allow overwrite, has reading in pages, writing in pages, and erasing in blocks as its basic operations, allows bad blocks, and has a limited lifetime. Therefore, to develop a high-performance, high-reliability storage device using the flash memory as a storage medium, there is a need for a technique of effectively taking the advantages of the flash memory, while overcoming the limitations of the flash memory. The FTL mainly plays this role. The FTL provides a block storage device system capable of overwriting to a host system by introducing the concept of mapping between logical sector addresses and flash memory physical addresses in order to overcome the limitation of the flash memory that it is not overwritable. Also, the FTL prevents future use of bad blocks that may be produced during an operation by means of remapping or performs a wear-leveling function that prevents a specific physical block from being excessively worn out.

Due to the recent scaling-down of a flash memory manufacturing process, the reliability of the flash memory has been decreased. In this context, the role and function of the FTL becomes more important in ensuring the reliability of a flash storage system.

SUMMARY

Accordingly, the present invention is directed to a hierarchical Flash Translation Layer (FTL) structure and a method for designing the same that substantially obviate one or more problems due to limitations and disadvantages of the related art.

An object of the present invention is to provide an FTL structure that forms a storage system through hierarchical composition of logs having a common data processing mechanism.

Another object of the present invention is to facilitate designing of an FTL structure, enable reuse of the FTL structure, and increase recovery accuracy of the FTL structure by means of hierarchically interacting logs.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a Flash Translation Layer (FTL) structure including mapping information for storing data includes a plurality of hierarchical data groups including a zeroth-layer host data group, and first-layer to $n^{th}$-layer metadata groups, and zeroth to $n^{th}$ logs configured in a hierarchical structure in correspondence with the respective hierarchical data groups, for processing data of the corresponding data groups. A $k^{th}$ log ($0 \leq k \leq n$) provides an interface to volatile memory resources dividedly allocated to the $k^{th}$ log, an interface to non-volatile memory resources dividedly allocated to the $k^{th}$ log, and an interface to at least one of $(k-1)^{th}$ and $(k+1)^{th}$ logs.

The interface to the at least one of the $(k-1)^{th}$ and $(k+1)^{th}$ logs may be a linear address space readable, writable, and bytewise-accessible.

The interface to the at least one of the $(k-1)^{th}$ and $(k+1)^{th}$ logs includes a read command, a write command, and a flush command. The read command may request reading of as many bytes as a byte count, starting at a start address of a log Identifier (ID) address space of the $k^{th}$ log and transmission of the read bytes to a data buffer address of an invoker, the write command may request transmission of data from the data buffer address and writing of as many bytes as a byte count, starting at the start address of the log ID address space, and the flush command may request persistent writing of the bytes written in the log ID address space to a non-volatile memory.

The zeroth log may provide an interface to a host system through an interface glue, and the interface glue may correct mismatch between a sector-based address space and a byte-based address space.

The $k^{th}$ log may include a metadata processing module for performing referencing and eviction of a meta cache of the $k^{th}$ log, and a crash recovery processing module for performing log write processing for recovery after power turn-off and data recovery during booting.

The log(k-1) request processing module may receive a non-volatile data write request from the $(k-1)^{th}$ log (if k=0, from the host system), write requested data in a non-volatile manner, and the crash recovery module adds updated metadata to a recovery log, update the recovery log in a non-volatile manner, finally log(k-1) request processing module provides a completion response to the $(k-1)^{th}$ log. If a meta cache space corresponding to the $k^{th}$ log is insufficient, log(k) metadata processing module may transmit write and flush request to the $(k+1)^{th}$ log, and crash recovery module removes the updated metadata from the recovery log after receiving a completion response, and update the recovery log in a non-volatile manner.

If k=n, the crash recovery processing module may not transmit the write and flush request to the $(k+1)^{th}$ log, and snapshot whole data corresponding to the $n^{th}$ log to a check-point area.

The $k^{th}$ log may further include a $(k-1)^{th}$ log request processing module for receiving a read, write, or flush request from the $(k-1)^{th}$ log (if k=0, from the host system), and processing the received request, a data copy-back processing module for performing data copy-back for block reclaim, wear-leveling and refresh write, and a NAND requests scheduling module for performing NAND requests scheduling in order to optimize bandwidth and latency.

As a mapping unit increases in size, n may decrease, and as the mapping unit decreases in size, n may increase.

The logs may commonly have the same data processing function for writing data to the dividedly allocated non-volatile memory block resources and updating metadata.

The zeroth log may correspond to the zeroth-layer host data group, and the first to $n^{th}$ logs may correspond to the first-layer to $n^{th}$-layer metadata groups, respectively.

If k=0, the interface to the at least one of the $(k-1)^{th}$ and $(k+1)^{th}$ logs may be interfaces with a host system and the first log, and if k=n, the interface to the at least one of the $(k-1)^{th}$ and $(k+1)^{th}$ logs may be an interface to an $(n-1)^{th}$ log.

A verified log among the logs may be applicable to another FTL.

The FTL may be capable of formally proving the correctness of recovery protocol.

According to another aspect of the present invention, a system for designing an FTL including mapping information for storing data includes a log developer for generating logs in a hierarchical structure in correspondence with respective hierarchical data groups of the FTL, for processing data of the corresponding data groups, a verifier for verifying the logs, a register for generating log components for logs verified by the verifier and registering the generated log components to a library, and a designer for designing the FTL by combining log components satisfying required conditions related to system performance and resource use amount for a target storage system from among the log components registered to the library. Each of the logs provides an interface to volatile memory resources dividedly allocated to the log, an interface to non-volatile memory resources dividedly allocated to the log, and an interface to at least one of a lower-layer log and a higher-layer log.

Each of the log components may include configurable properties, and the log developer develops one or more other logs by instantiating one log template and changing the configurable properties of the log template.

A method for designing an FTL structure including mapping information for storing data includes generating a plurality of hierarchical data groups including a zeroth-layer host data group, and first-layer to $n^{th}$-layer metadata groups, and designing zeroth to $n^{th}$ logs in a hierarchical structure in correspondence with the respective hierarchical data groups, for processing data of the corresponding data groups. A $k^{th}$ log (0≤k≤n) provides an interface to volatile memory resources dividedly allocated to the $k^{th}$ log, an interface to non-volatile memory resources dividedly allocated to the $k^{th}$ log, and an interface to at least one of $(k-1)^{th}$ and $(k+1)^{th}$ logs.

The interface to the at least one of the $(k-1)^{th}$ and $(k+1)^{th}$ logs may be a linear address space readable, writable, and bytewise-accessible.

The interface to the at least one of the $(k-1)^{th}$ and $(k+1)^{th}$ logs may include a read command, a write command, and a flush command. The read command may request reading of as many bytes as a byte count, starting at a start address of a log ID address space of the $k^{th}$ log and transmission of the read bytes to a data buffer address of an invoker, the write command may request transmission of data from the data buffer address and writing of as many bytes as a byte count, starting at the start address of the log ID address space, and the flush command may request persistent writing of the bytes written in the log ID address space to a non-volatile memory.

The zeroth log may provide an interface to a host system through an interface glue, and the interface glue may correct mismatch between a sector-based address space and a byte-based address space.

The designing of zeroth to $n^{th}$ logs may include performing a metadata processing by performing referencing and eviction of a meta cache of the $k^{th}$ log, and performing a crash recovery process by performing log write processing for recovery after power turn-off and data recovery during booting.

The performing of a crash recovery process may include receiving a non-volatile data write request from the $(k-1)^{th}$ log (if k=0, from the host system), writing requested data in a non-volatile manner, adding updated metadata to a recovery log, updating the recovery log in a non-volatile manner, and providing a completion response to the $(k-1)^{th}$ log, and if a meta cache space corresponding to the $k^{th}$ log is insufficient, transmitting write and flush request to the $(k+1)^{th}$ log, removing the updated metadata from the recovery log after receiving a completion response, and updating the recovery log in a non-volatile manner.

The performing of a crash recovery process may further include, if k=n, snapshotting whole data corresponding to the $n^{th}$ log to a check-point area without transmitting the write and flush request to the $(k+1)^{th}$ log.

The designing of zeroth to $n^{th}$ logs may further includes receiving a read, write, or flush request from the $(k-1)^{th}$ log (if k=0, from the host system), and processing the received request by the $k^{th}$ log, performing data copy-back processing for block reclaim, wear-leveling and refresh write by the $k^{th}$ log, and performing NAND request scheduling for optimizing performance by the $k^{th}$ log.

As a mapping unit increases in size, n may decrease, and as the mapping unit decreases in size, n may increase.

The logs may commonly have the same data processing function for writing data to the dividedly allocated non-volatile memory block resources and updating metadata.

The zeroth log may correspond to the zeroth-layer host data group, and the first to $n^{th}$ logs may correspond to the first-layer to $n^{th}$-layer metadata groups, respectively.

If k=0, the interface to the at least one of the $(k-1)^{th}$ and $(k+1)^{th}$ logs may be interfaces with a host system and the first log, and if k=n, the interface to the at least one of the $(k-1)^{th}$ and $(k+1)^{th}$ logs may be an interface to an $(n-1)^{th}$.

A verified log among the logs may be applicable to another FTL.

The FTL may be capable of formally proving the correctness of recovery protocol.

According to another aspect of the present invention, a method for designing an FTL including mapping information for storing data includes developing logs by generating the logs in a hierarchical structure in correspondence with respective hierarchical data groups of the FTL, for processing data of the corresponding data groups, verifying the logs, generating log components for logs verified by the verifier and registering the generated log components to a library, and designing the FTL by combining log components satisfying required conditions related to system performance and resource use amount for a target storage system from among the log components registered to the library. Each of the logs provides an interface to volatile memory resources dividedly allocated to the log, an interface to non-volatile memory resources dividedly allocated to the log, and an interface to at least one of a lower-layer log and a higher-layer log.

Each of the log components may include configurable properties and the development of logs comprises developing one or more other logs by instantiating one log template and changing the configurable properties of the log template.

Besides, other methods and other systems for implementing the present invention, and a computer-readable medium storing a program for performing the above method are further provided.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
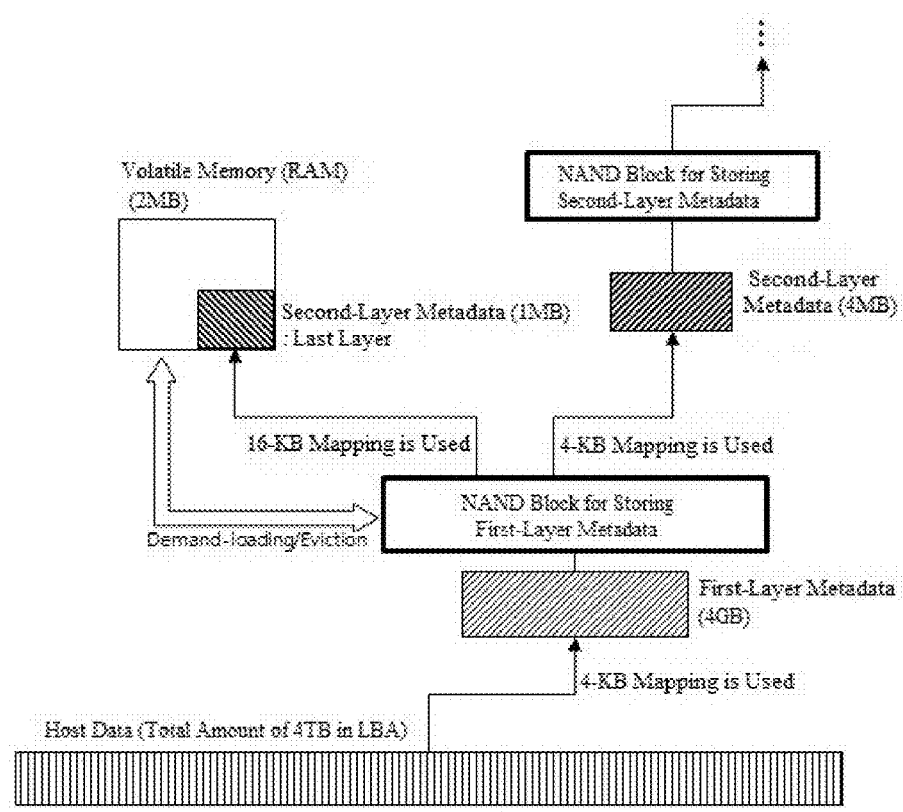
FIG. 1 illustrates hierarchical extension of meta data according to an embodiment of the present invention.

A detailed description of the present invention as set forth is given with reference to the attached drawings illustrating specific embodiments by which the present invention can be practiced, as examples. The embodiments are described in great detail enough to enable those skilled in the art to practice the present invention. It is to be appreciated that various embodiments of the present invention are different from one another but need not to be mutually exclusive. For example, another embodiment may be implemented by modifying specific shapes, structures, and features according to one embodiment, disclosed in the present disclosure without departing from the scope and spirit of the present invention. Further, it is to be understood that the positions or arrangement of individual components in each embodiment can be changed within the scope and spirit of the present invention. The embodiments described below are therefore to be construed in all aspects as illustrative and not restrictive. The scope of the present invention should be determined by the appended claims and their legal equivalents, and all changes coming within the meaning and equivalency range of the appended claims are intended to be embraced therein. Like reference numerals denote the same or similar components in various aspects.

Now, embodiments of the present invention will be described in detail with reference to the attached drawings so that those skilled in the art may readily practice the present invention.

A non-volatile storage device has the capability of writing and referring to non-volatile data by retaining data even though power is turned off. The non-volatile storage device provides a Logical Block Address (LBA) space to a host system. A flash storage device is a type of non-volatile storage device, using a flash memory. A flash storage system may generically refer to a functional system including a flash storage device. The flash storage device includes a data transmission module that connects the host system to the flash memory, an interface module, and various modules for executing storage device functionalities and increasing performance and reliability. While the following description is given in the context of a NAND flash memory, the present invention is not limited to the NAND flash memory.

In general, a flash storage device requires a special internal control mechanism called Flash Translation Layer (FTL). The FTL generically refers to control mechanism required to implement the functions of a non-volatile storage device by means of a flash memory that does not allow overwrite.

More specifically, the flash memory supports three operations, read, program, and erase, and it is impossible to overwrite the flash memory. Before data is written, an erase operation should be performed in the flash memory. In other words, since the NAND flash memory allows write only in an erased memory block (erase-before-program restriction), data corresponding to a new write request from a host should be redirected to a previously erased physical position. This implies that the FTL should maintain virtual address-physical address mapping information in a predetermined form to provide latest data in response to a read request from the host system. To reuse or erase a block containing only programmed pages, the FTL should perform block cleaning, also called garbage collection.

That is, the FTL maintains mapping information between virtual addresses and physical addresses in a predetermined form in order to remap new write data to a previously erased memory position and provide latest data in response to a read request from the host.

In regard to the size of a mapping unit, if the FTL uses a large mapping unit to manage mapping information about data (e.g., in the case of mapping on a NAND block basis), the total amount of mapping information is reduced. Therefore, a small capacity of a main memory (e.g., a Static Random Access Memory (SRAM) or a Dynamic Random Access Memory (DRAM)) is required to maintain mapping data (thus, efficient in cost), on the other hand, data of a mapping unit size should always be moved along. Thus, the resulting large overhead of read-modify-write decreases the processing speed of a write request for data of a size smaller than the mapping unit.

Legacy FTLs sought to minimize a required capacity of an expensive main memory, for the purpose of reducing the cost of a target storage system. Therefore, a large mapping unit, generally a mapping unit of a NAND block size is used. If this blockwise mapping is used, an FTL may maintain the whole mapping data in a small main memory. As a consequence, the mapping data has a small operation overhead during runtime, and is recovered relatively easily during booting. In other words, since mapping data is small in size, the FTL may process the mapping data simply, and the mapping data processing does not greatly affect the performance and reliability of the target storage system.

On the other hand, if a small mapping unit (e.g., pagewise mapping) is used, the total amount of mapping information is increased, but the processing time of a host write request for data of a small size is shortened. As a write performance requirement for a small size (e.g., 4 kilobytes) has recently increased, the mapping unit is getting smaller.

Meanwhile, data processed by a flash storage system includes host data requested by a host system, and metadata internally maintained by the FTL to manage the host data. The metadata includes mapping data indicating the stored positions of the host data.

In most of conventional technologies, FTL sub-components are defined separately to process metadata, and a processing part related to the sub-components is constructed separately from a host data processing part. Further, information is exchanged between the two separate components (or processing parts) of the FTL, not via a standardized interface but via an ad hoc interface customized by each manufacturer. This trend is attributed to relatively overlooked significance of processing of metadata in the FTL on the implicit assumption that the processing of metadata has a marginal influence in the performance and reliability of an overall storage system.

However, as the capacity of the storage system increases, the amount of metadata is also increased. Thus, more system resources (a higher use rate of a micro processor and more volatile/non-volatile memory space) are required to process the metadata. That is, along with the increase of the capacity of the target storage system, more and more mapping information is required, and there is a more pressing need for hierarchical extension of a meta structure in two aspects, that is, the cost of the storage system (a volatile memory space for storing mapping data) and recovery performance during booting (time taken to reincarnate mapping data to the volatile memory).

To solve the above problem, the present invention proposes a new FTL structure and a method for designing FTLs in consideration of hierarchical extension of a metadata structure. An FTL according to an embodiment of the present invention may be configured in software, hardware, or an appropriate combination of both.

FIG. 1 illustrates hierarchical extension of metadata according to an embodiment of the present invention.

Hierarchical extension of metadata means the introduction of a hierarchical structure between metadata without processing the metadata in a single layer. For reference, this is similar in principle to the introduction of multi-level paging mapping along with the increase of an address space size in a virtual memory system. Although metadata of the FTL includes not only mapping information but also block information (e.g. allocation state, validity) of a flash memory, mapping information occupies the most proportion of the metadata in quantity. While the following description is given with the implicit assumption that metadata is the same as mapping information, the metadata is extensible to a larger range, not limited to the mapping data.

FIG. 1 illustrates an example in which for 4-TB host Logical Block Address (LBA) data, a 2-MB volatile memory (RAM), and a mapping unit of a small size, 4 KB, mapping of the FTL is hierarchically extended. This particular configuration of a flash storage system may seem unpractical in the date of the invention but is given for the illustration of hierarchical expansion of metadata.

More specifically, if the total amount of LBA host data is 4 TB and 4 KB-based mapping is used (the size of each entry of mapping information is 4 bytes), a total of 4-GB first-layer metadata will be required. In the embodiment of FIG. 1, since an available volatile main memory is 2 MB in size, all of the first-layer metadata may not be stored in the available volatile main memory. Accordingly, the first-layer metadata is divided into fragments, the fragments are stored in NAND blocks of a non-volatile memory, and second-layer mapping information is required to determine the positions of the distributedly stored first-layer metadata.

A mapping unit of the first-layer (meta)data determines the total amount of the second-layer metadata. If total mapping layers are limited to two or fewer layers, a 16-KB mapping unit may be used. Then, the second-layer metadata is 1 MB and all of the second-layer metadata may be stored in the volatile memory (RAM). Therefore, the second-layer metadata resides in the last layer of the hierarchical mapping structure as illustrated on the left side of FIG. 1. Or if the mapping layers are to be extended to more than two mapping layers in view of the need for a small mapping unit, the mapping unit of the first-layer (meta)data may be 4 KB, like the host data. Herein, the second-layer metadata is 4 MB, exceeding the storage capacity of the volatile memory. Thus, third-layer mapping information is required to locate the second-layer metadata.

In this manner, if a small mapping unit is used, the FTL according to the embodiment of the present invention may hierarchically extend metadata.

Meanwhile, a conventional FTL structure does not consider hierarchical extension of metadata, simply dividing FTL into two separate processing parts (one for host data and the other for all of metadata).

Figure 2:
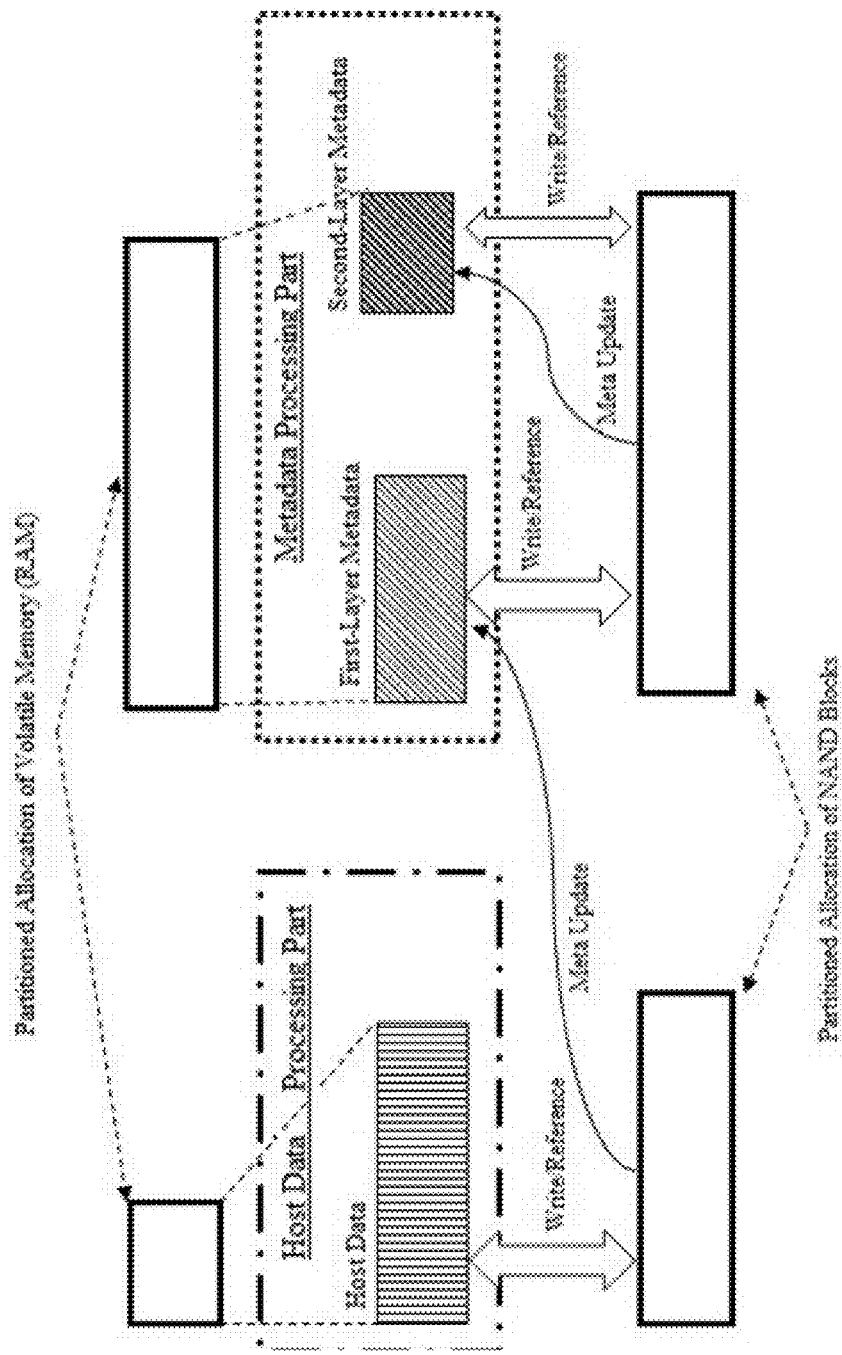
FIG. 2 illustrates an exemplary Flash Translation Layer (FTL) structure that dichotomously separates host data processing from metadata processing.

FIG. 2 illustrates an exemplary FTL structure that dichotomously separates host data processing from metadata processing.

Referring to FIG. 2, a host data processing part of the FTL writes/refers to a NAND block dividedly allocated to host data, and accelerates host data processing using a dividedly allocated volatile memory. Also, a metadata processing part of the FTL writes/refers to a NAND block dividedly allocated to metadata, and accelerates data processing of each layer using a dividedly allocated volatile memory.

That is, the conventional approach does not incorporate the hierarchical structure of metadata into the FTL design implementation, cramming processing parts of all metadata layer into one single processing part. In this approach, it is difficult to share or reuse common processing mechanism between the host data processing part and the metadata processing part while both of them has similar FTL functions such as remapping, block cleaning, and recovery. Therefore, the two, similar but not sharable, processing parts incur redundant task in developing and verifying a flash storage system. Moreover, since the two processing parts (a host data processing part and a metadata processing part) interact with each other not via a standardized interface but via a specialized interface, their utility is limited to one product family. This results in serious inefficiency in development of a new flash storage system, because interaction of each processing part, for example, a task of data exchange during runtime or a task of data recovery during booting should be revalidated in every product development cycle. According to the conventional FTL construction method, if special requirements are given according to the purpose of a storage system, the host data processing part and the metadata processing part should be either modified significantly or redesigned from the ground up for the target storage system. As a result, more time and cost are taken for development and verification.

In other words, despite the presence of many common components (components that write data to NAND or update meta information, and the like) in data processing between the two processing parts, they are designed/developed as completely separate components in the conventional FTL, thereby wasting time and cost in code writing and verification.

Meanwhile, a specific protocol is required between the two separate processing parts for the correct recovery of data under the presence of sudden power-off (a.k.a crash). In conventional method, however, because the design of the two processing parts are modified each time a new storage device is developed, an ad hoc protocol is used and it repeatedly incurs significant efforts to verify the correctness of the recovery operation. In contrast, an FTL according to an embodiment of the present invention faithfully reflects hierarchical structure of metadata and provides individual data storage components (logs) sharing the common FTL processing mechanism irrespective of host data or each layer of metadata, and constructs a flash storage system by hierarchically composing such individual components. The core feature of the FTL proposed by the present invention lies in that individual data storage components (logs) are hierarchically arranged reflecting hierarchical structure of metadata, and interact with each other via a standardized interface. Thus, this may be referred to as a Hierarchical Interacting a set of Logs (HIL) scheme (or structure). In the HIL according to an embodiment of the present invention, logs are individual data storage components that provide the same data processing mechanism (mapping, cleaning, and recovery) and function as primitive components of the FTL. That is, the FTL may be configured through hierarchical composition of logs in the embodiment of the present invention. This structure may be referred to as HIL.

In the HIL scheme according to the embodiment of the present invention, a flash storage is defined by a set of separate data groups and their hierarchical interaction. Each data group is managed by means of a log and included in the log. Further, the log is reconfigurable, and provides general FTL functions such as mapping, cleaning, and recovery.

Figure 3:
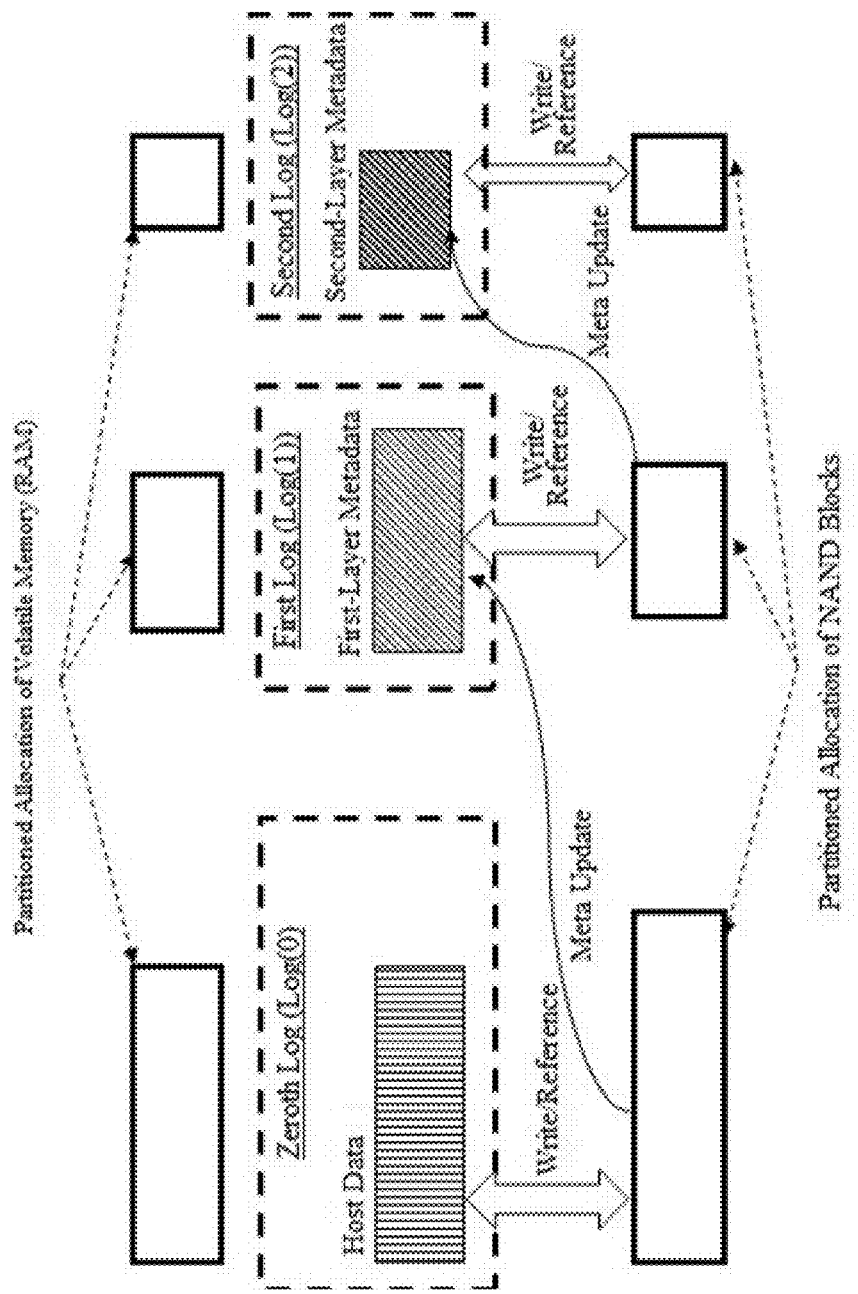
FIG. 3 illustrates an FTL using Hierarchical Interacting a set of Logs (HIL) according to an embodiment of the present invention.

FIG. 3 illustrates an FTL using the HIL scheme according to an embodiment of the present invention.

In the embodiment illustrated in FIG. 3, the FTL includes a hierarchical mapping data structure of first-layer metadata and second-layer metadata. Referring to FIG. 3, it may be noted that each data group of the FTL (host data, the first-layer metadata, and the-second layer metadata) is managed by a log in the embodiment of the present invention. According to the hierarchical structure of the data groups, the logs corresponding to the data groups are also hierarchically connected and communicate through a standardized interfacing scheme according to an embodiment of the present invention.

More specifically, according to an embodiment of the present invention, the FTL may not implement separate data processing mechanisms for host data and metadata. Instead, the host data group and the metadata groups may be managed by 'logs' providing a common data processing mechanism. That is, the host data may be managed by a zeroth log, Log(0), the first-layer metadata may be managed by a first log, Log(1), and the second-layer metadata may be managed by a second log, Log(2). Like the host data, the first-layer metadata, and the second-layer metadata, the zeroth, first, and second logs are also connected hierarchically. For the convenience of description, a $k^{th}$ log may be represented as Log(k) (e.g., the zeroth log may be represented as Log(0)), herein below.

Since Log(0), Log(1), and Log(2) may be individual instances of general Log(k) that provide a common data processing mechanism, there may be no need for designing/implementing processing parts for host data and metadata separately as in the example of FIG. 2. Therefore design cost may be reduced by applying HIL according to the embodiment of the present invention.

According to an embodiment of the present invention, the HIL defines a functional specification of a general Log(k) and a common standardized interface specification between the logs. According to an embodiment of the present invention, the specification of logs may include all of functions required for storing data of each layer, enable the correctness proof of recovery, and reduce the load of an interface for data exchange between logs. However, the logs according to the embodiment of the present invention are not limited to a specific functional specification and interface specification.

the key spirit of the invention is that Firstly, a log serves as a configurable storage component by incorporating general FTL functions (remapping, block cleaning, recovery process etc) and flash storage systems could be built by a hierarchical composition of these log instances, Secondly, each log communicates with adjacent components through a standard interface, enabling reusability and provable correctness of recovery.

Figure 4:
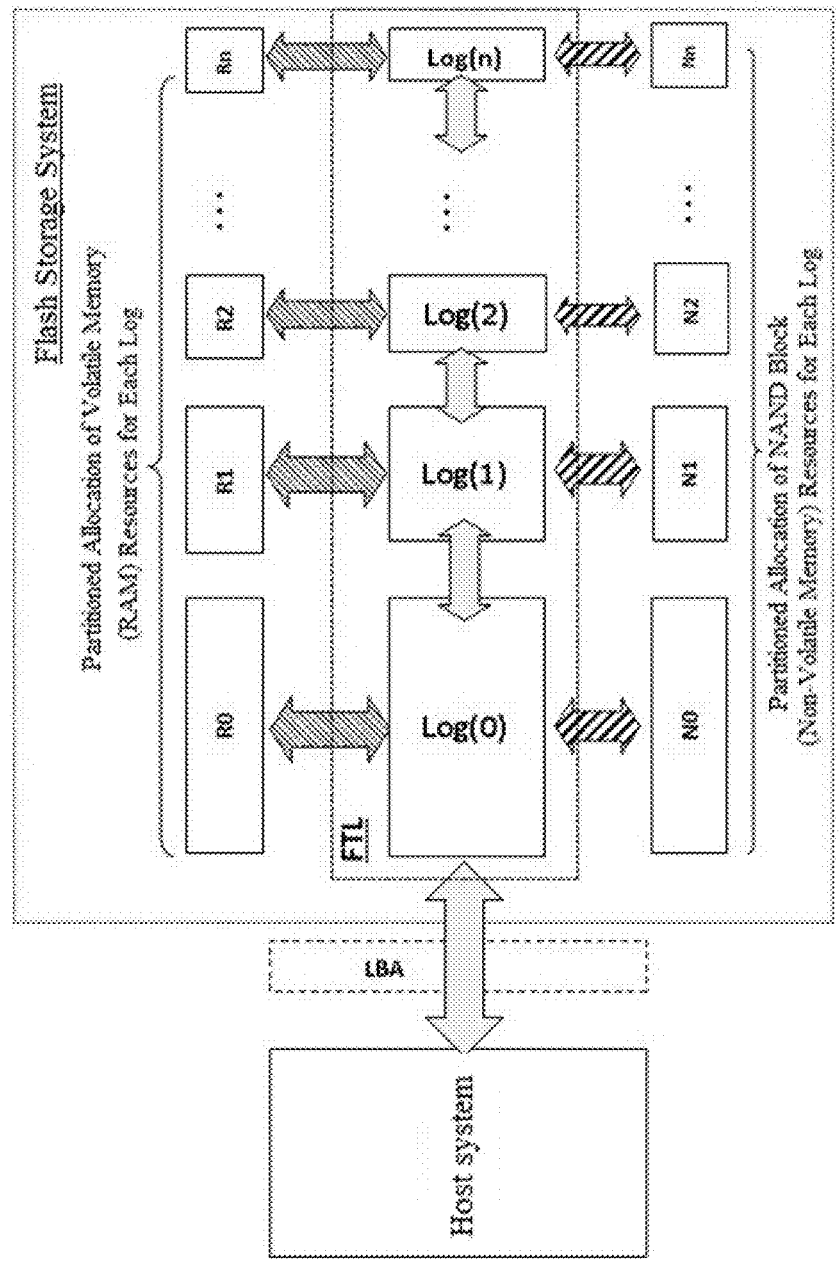
FIG. 4 illustrates an exemplary flash storage system including an FTL for which HIL is implemented according to an embodiment of the present invention.

FIG. 4 illustrates an exemplary flash storage system including an FTL for which HIL is implemented according to an embodiment of the present invention.

More specifically, FIG. 4 illustrates an overall structure of HIL that defines a flash storage system by hierarchical data groups and their interaction. As described before, data groups may be managed by logs which are storage primitives of the storage system according to an embodiment of the present invention. Also, the logs may provide general FTL functions such as mapping, cleaning, and recovery processes.

Referring to FIG. 4, it may be noted that the FTL of the flash storage system includes a zeroth log Log(0), a first log Log(1), . . . , an $n^{th}$ log Log(n). As described before with reference to FIG. 3, Log(0) may process a host data group, Log(1) may process a first-layer metadata group, Log(2) may process a second-layer metadata group, and Log(n) may process an $n^{th}$-layer metadata group. Particularly, Log(0) may process the host data by interacting with a host system through a readable, writable non-volatile address space (e.g., an LBA space).

Reference characters N0, N1, . . . , Nn denote the resources of non-volatile NAND memory blocks dividedly allocated to the respective logs. Reference characters R0, R1, . . . , Rn denote resources of a volatile memory (RAM) dividedly allocated to the respective logs. Referring to FIG. 4, while the memory areas allocated to the logs are separate, this is just logical separation. In real implementation, the memory areas may not be physically separate, and may be shared between a plurality of logs by virtualization.

Non-volatile write of data in Log(0) may trigger update of Log(0)'s mapping information (=data of Log(1)). It may be either (1) cached in volatile memory or (2) transferred through an interface between Log(0) and Log(1) and written in a NAND block of Log(1). A determination of (1) or (2) is dependent on the size of the volatile memory of Log(0) and Log(1) and the cache management policy of each log. In the case of (2), updated mapping data of Log(1) data may be transmitted in turn to Log(2), and this cascaded action may be repeated up to a top layer capable of storing all data within an allocated capacity of a volatile memory, that is, Log(n) being a root log. Since the data of the top-layer log is periodically written in NAND blocks for recovery purpose, and the whole data is written in the NAND memory, higher-layer mapping is not needed. The latest version of the top-layer data (data of Log(n) and mapping data of Log (n−1)) may be readily recovered by scanning NAND blocks allocated to Log(n).

Now, a detailed description will be given of embodiments of the interface specification and functional specification of the logs illustrated in FIG. 4.

Figure 5:
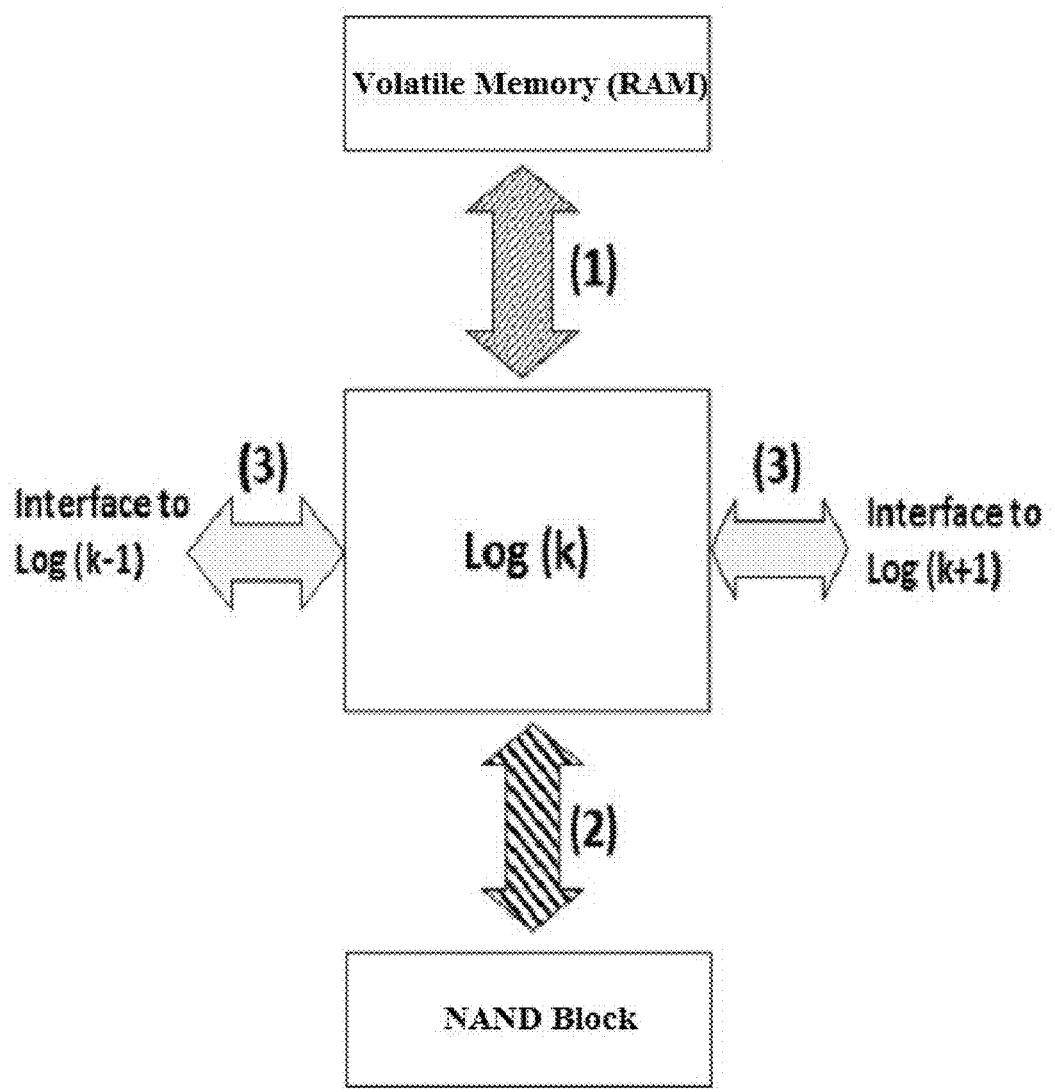
FIG. 5 illustrates interface protocols for logs according to an embodiment of the present invention.

FIG. 5 illustrates interface protocols for logs according to an embodiment of the present invention.

Referring to FIG. 5, each of the logs illustrated in FIG. 4 communicates with other components of the storage device through three different interface protocols, for implementation of HIL according to an embodiment of the present invention. As illustrated in FIG. 5, the three different interfaces are (1) an interface to a volatile memory (RAM), (2) an interface to a non-volatile memory (NAND flash memory), and (3) an interface between logs. That is, the logs may commonly have the interface protocols of (1), (2), and (3) in the HIL structure illustrated in FIG. 4. (1) the interface to the volatile memory may be a general memory interface, and enables data read and write (in bytes) from and to the volatile memory. (2) The interface to the non-volatile memory enables data erasure (in blocks), programming (in pages), and reading (in pages) for the non-volatile memory.

As each log communicates with other components of the storage device through a uniform set of interface protocols, the log is compatible with any layer of the storage system, and an FTL may be configured by an arbitrary hierarchical composition of logs. Further, if an existing memory protocol is used, interfaces between a log and the volatile memory and between the log and the NAND flash memory may be designed in a straightforward manner.

More specifically, according to an embodiment of the present invention, a log may access the volatile memory (typically, an SRAM or a DRAM) via a general-purpose memory interface that provides read and write operations for a byte addressing range. The log may buffer data and cache metadata in the volatile memory through the interface, and an accessible physical address range of the volatile memory is based on allocation information of volatile memory, partitioned during initial storage system configuration.

Also, a log according to an embodiment of the present invention may access the non-volatile memory (NAND flash memory) via an interface that provides programming, reading, and erasing operations. The log may store data of the log in a NAND block through the interface, and an accessible physical address range of the non-volatile memory (NAND flash memory) is based on allocation information of non-volatile memory (NAND blocks), partitioned during the initial storage system configuration.

For reference, the non-volatile memory (NAND flash memory) supports read and programming operations in pages (in units of a plurality of bytes), a plurality of pages form a block which is a unit for erasure, and a flash memory chip includes a plurality of blocks. Although efforts have been made on standardization, NAND flash memories differ in interfaces and other detailed functions depending on memory providers. To build a flash memory storage system, various hardware architecture supports are required to increase the limited performance and reliability of a single flash memory chip. For example, control hardware adopting an interleaving structure similar to that of a Redundant Array of Independent Disks (RAID), and a non-volatile memory (NAND flash memory) interface specialized for the control hardware may be used to increase the performance and reliability of a flash storage system.

According to an embodiment of the present invention, HIL may allow any interface protocol used for each flash memory type, and accommodate even an extended interface of any type for a specialized (flash memory control) hardware architecture. That is, the HIL does not limit the non-volatile memory interface of a log to any specific type of flash memory and control hardware structure, only enforcing that the logs of one storage system should use the same type of (a standardized) non-volatile memory interface. In other words, logs having different non-volatile memory interfaces may not be used compatibly in a single flash storage system in the HIL structure.

According to an embodiment of the present invention, a log may provide an interface between logs, as illustrated in FIG. 5. That is, Log(k) may provide interfaces with Log(k−1) and Log(k+1). Log(0) provides interfaces with Log(1) and the host system. This may be implemented by introducing a special (or low-overhead) interface glue (see FIG. 6) to eliminate the difference between the host LBA interface and the interface between logs. For Log(n) (the top-layer log) corresponding to a metadata group of the last layer, an interface to Log(n+1) exists but is not used.

Additionally, according to an embodiment of the present invention, the specification of an interface between logs may require, but not limited to, (1) readable and writable, (2) accessible in bytes, and (3) a linear address space.

In another embodiment of the present invention, read/write/flush of conventional storage system may be presented as the specification of an interface between logs. In this case, each read/write/flush command may be configured and used as follows.

Read (Log ID, start address, byte count, data buffer address); it requests reading of as many bytes as a byte count, starting from a start address of a Log ID address space, and transmission of the data to a data buffer address of an invoker.

Write (Log ID, start address, byte count, data buffer address); it requests transmission of data from the data buffer address of the invoker and write of the data, starting at the start address of the Log ID address space. However, a completion response does not ensure non-volatile, persistent write of the write-requested data.

Flush (Log ID); it requests persistent write of all the bytes previously written (but may be cached in volatile memory) in the Log ID address space. If a completion response is received, it ensures non-volatile, persistent write of previous write requests.

Figure 6:
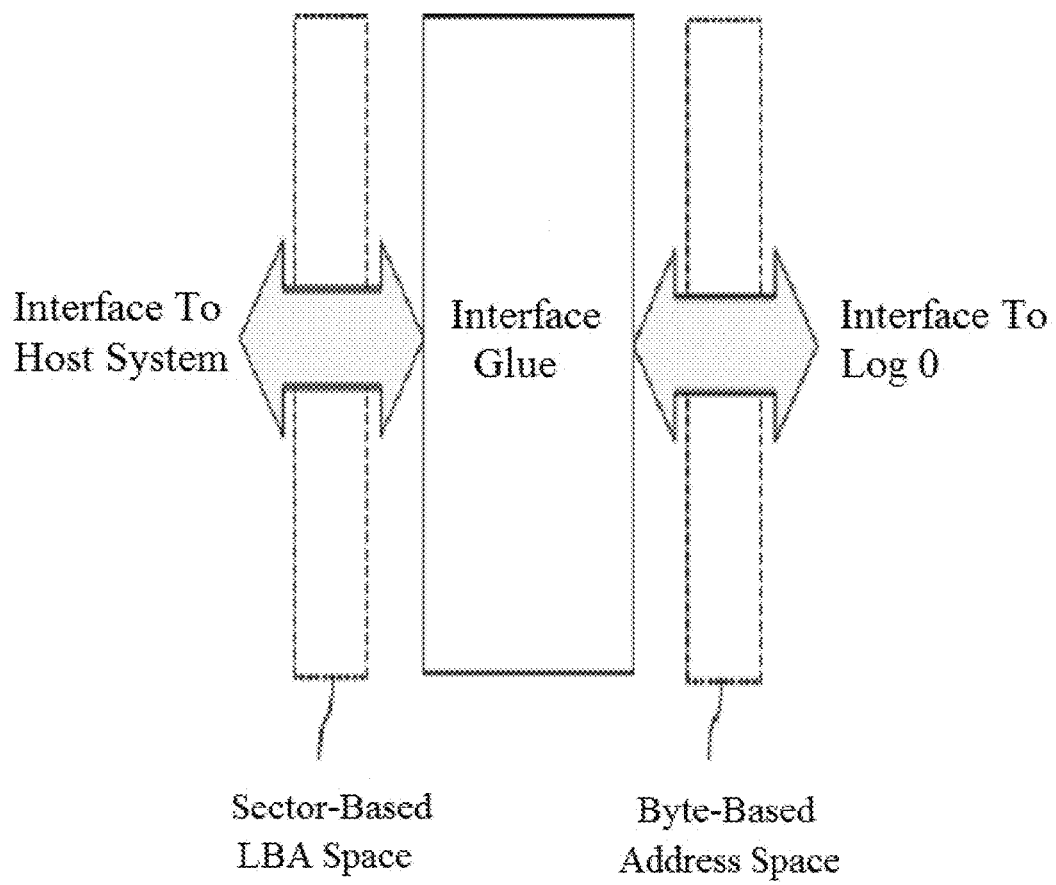
FIG. 6 illustrates an interface glue according to an embodiment of the present invention.

FIG. 6 illustrates an interface glue according to an embodiment of the present invention.

In HIL according to an embodiment of the present invention, Log(0) corresponding to the host data group does not interact directly with the host system. Instead, the interface glue may provide an interface between the host system and Log(0). The interface glue may be applied to overcome mismatch between a sector-based (512 bytes) LBA model most widely used commercially at present and a byte-based address space according to an embodiment of the present invention.

Referring to FIG. 6, the interface glue according to the embodiment of the present invention may provide an interface to the host system, for example, ACHI or NVMe using the sector-based LBA space. Also, the interface glue according to the embodiment of the present invention may provide an interface to Log(0) (the log that processes host data) using the byte-based address space.

The interface between logs according to the embodiment of the present invention is different from an interface required between Log(0) and the host only in terms of an operation unit (byte or host sector). However, the interfaces are identical in terms of the types of supported operations (read/write/flush). Therefore, switching between two interfaces through the interface glue may be performed without an additional large overhead.

For reference, the internal functional specification of a log as described below is an exemplary organization of functional components generally required for writing/managing data in a non-volatile manner using a NAND flash memory, on a module basis. The internal functional specification of a log presents a guideline for designing and implementing an actual log. However, the functional module organization of an actual log may be newly modified in order to optimize the performance and reliability of the storage system. In other words, it is possible to change the organization of functional modules within a range conforming to a predetermined interface protocol. Within a fixed organization of functional modules, various optional parameters for each module could be given in terms of a log mapping unit (4 KB or 16 KB), a block cleaning algorithm (greedy or cost-benefit), and the like, and such design options may be selected according to requirements for the performance, reliability, and cost of a target storage system. If various options of the internal function module of each log are designed to be reconfigurable, the reusability of the log may be increased significantly.

Figure 7:
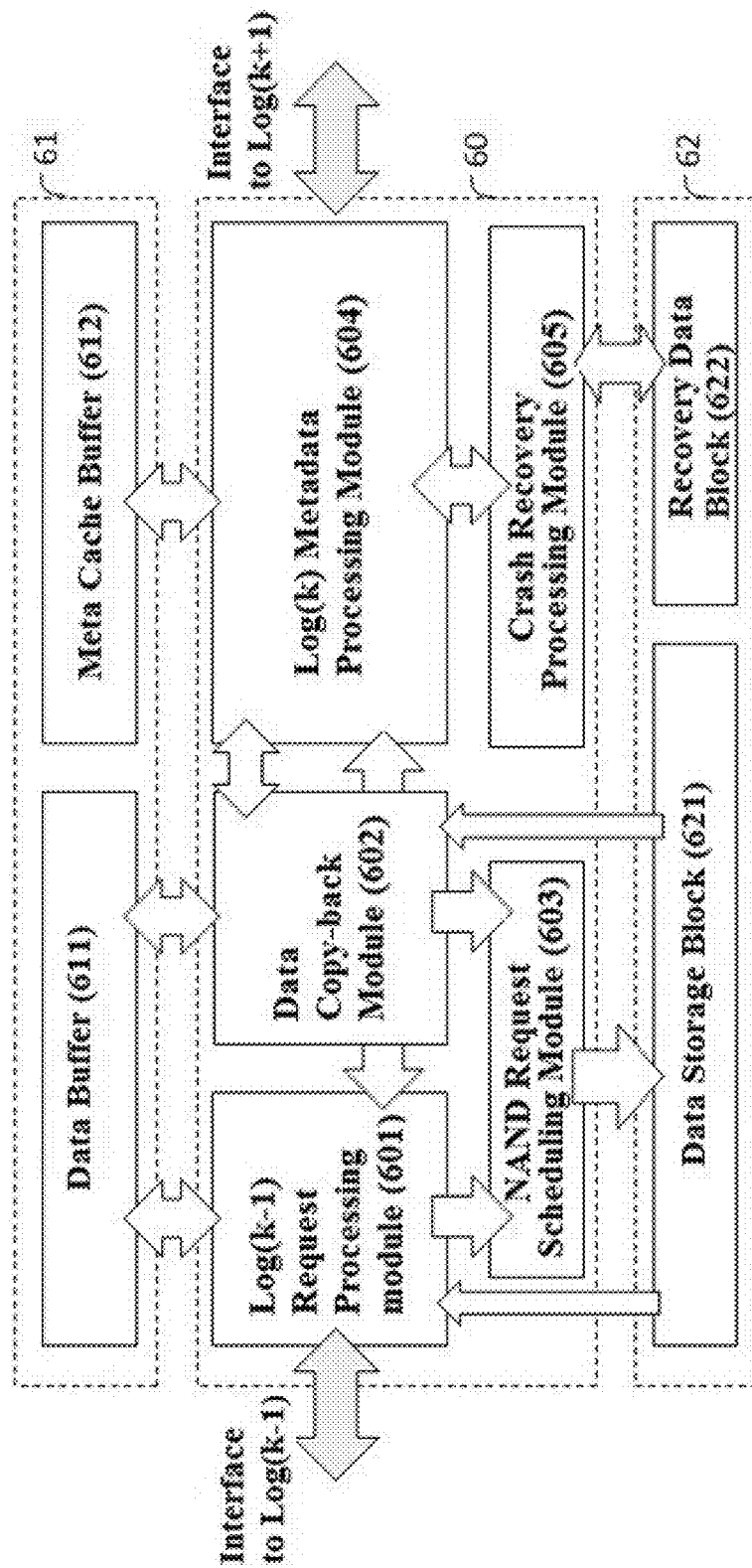
FIG. 7 is an internal function block diagram of each log according to an embodiment of the present invention.

FIG. 7 is an internal functional block diagram of each log according to an embodiment of the present invention.

In the embodiment of FIG. 7, the internal functional specification of a log, particularly Log(k) 60 in the FTL of a flash storage system is illustrated as a block diagram. Each internal component of Log(k) may interact with a volatile memory 61 and a NAND block 62 which are dividedly allocated to Log(k).

More specifically, Log(k) 60 includes a Log(k−1) request processing module 601, a data copy-back module 602, a NAND request scheduling module 603, a Log (k) metadata processing module 604, and a crash recovery processing module 605, as a functional specification. An area of the volatile memory 61 dividedly allocated to Log(k) 60 includes a data buffer 611 and a meta cache buffer 612, whereas the NAND block 62 dividedly allocated to Log(k) 60 includes a data storage block 621 and a recovery data block 622.

First, the Log(k−1) request processing module 601 receives a read/write/flush request from Log(k−1) and executes the operations. The Log(k−1) request processing module 601 may process a read/write/flush request from Log(k−1) following the specification of an inter-log interface as described before with reference to FIG. 5.

(1) Write request processing—Data requested to be written by Log(k−1) may be buffered temporarily in the data buffer 611 of the volatile memory or written directly to the data storage block 621 of the non-volatile memory according to the vacancy state of the buffer. Various algorithms such as First Input First Output (FIFO) or Least Recently Used (LRU) may be used selectively as a data buffer management policy. If the data is written to the data storage block 621 due to lack of space in the data buffer 611, updated mapping data is provided to the metadata processing module 604.

(2) Read request processing—If data is already present at an address of the data buffer 611, requested by Log(k−1), the data may be transmitted directly from the data buffer 611. Otherwise, mapping data of data to be read may first be acquired from the metadata processing module 604, and according to the retrieved mapping data, the read data may be transmitted from a position of the data storage block 621. The data read from the data storage block 621 may be retained in a separate cache space of the data buffer 611 for the case of the next read request, and a management policy may be selected for the cache space in various manners.

(3) Flush request processing—Write data that remains in the data buffer 611 to be written to the data storage block 621 is all written in a non-volatile manner. After the writing is completed, a completion response is transmitted to a lower-layer log.

Also, (1) if there is a lack of NAND blocks due to continuous data writing of the Log(k−1) request processing module 601, (2) if the wearing difference between NAND blocks (the difference in Program/Erasure cycles) becomes larger than a reference value, or (3) if refresh writing is needed due to a reliability problem (read disturbance/retention or the like) of the flash memory, the data copy-back module 602 may copy data to a new position in NAND blocks. When block reclaiming (block cleaning or garbage collection) is performed in the case of (1), various algorithms including a greedy algorithm and a cost-benefit algorithm are available as a policy for selecting a target block wherein copy data reside. In the case of wear-leveling in (2), a triggering condition and a criterion for selecting a target block need to be selected, and this should be adjusted based on the reliability characteristics of a NAND flash memory used in a storage system. In the case of a refresh write operation of (3), a policy for setting a triggering condition of the copy-back operation and controlling the number of copy-back operations may be selected according to the reliability characteristics of a NAND flash memory used in a storage system.

The NAND request scheduling module 603 performs scheduling of various NAND operations (erase/program/read), issued by Log (k−1) requests processing module 601 and data copy-back module 602, in order to optimize latency and bandwidth of data writing and reading task. This module may use techniques of interleaving or out-of-order request execution to efficiently utilize parallelism of multiple flash channels and dies (Conventionally, some or large portion of this module may be fabricated into hardware depending on performance requirement.)

Further, the Log (k) metadata processing module 604 interacts with the meta cache buffer 612 of the volatile memory, and manages a meta cache by referencing and evicting the meta data. The metadata processing module 604 maintains frequently referenced metadata (mapping data) in a cache based on the locality of information reference. Upon receipt of a reference request from a nearby module, the metadata processing module 604 retrieves the metadata from the cache and provides the metadata. Or in the absence of the data in the cache, the metadata processing module 604 acquires the metadata directly via an interface (read bytes) to Log(k+1). Upon receipt of a metadata update request from a nearby module, the metadata processing module 604 also retains the data in the cache temporarily, thereby expecting processing of an update within the overwritable volatile memory cache, upon receipt of the next update request. If the remaining space of the cache is insufficient, writing of part of the metadata in the cache to Log(k+1) is requested, thereby securing an empty space in the cache. Various placement policies such as direct-mapped, set-associative, and circular queuing are available for the meta cache. More specifically, eviction policies such as FIFO or LRU may be selected for the cache. The size of the meta cache buffer 612 and the management policies may play an important role in reducing the overhead of data transmission through an interface to Log(k+1). If Log(k) is a root log, that is, Log(k) is a log corresponding to a metadata group of the last layer, there is no need for a cache management policy because all of its data resides in the meta cache (volatile memory).

The crash recovery processing module 605 interacts with the recovery data block 622 of the non-volatile memory, while performing (1) a recovery log write operation during runtime and (2) a metadata recovery operation during booting, in order to recover data into the state before power-down. If Log(k) is a root log (a top-layer log), the whole metadata is written by snapshot, and when booting, the latest snapshot is detected and loaded.

Recovery of Log (k) during booting means recovering its metadata (=data of Log(k+1)) into the state right before power-down, by which committed persistent data of Log(k) could be successfully located. Although the non-volatile version of the metadata of Log(k) is maintained (and managed) by Log(k+1) in the HIL structure, the latest volatile metadata may be solely kept by the metadata processing module 604 of Log(k) for performance reason. To prevent loss of the metadata kept in the meta cache of Log(k) by abrupt power-down, (1) Log(k) should maintain a recovery log according to a protocol agreed between logs during runtime, and (2) Log(k) performs a metadata recovery during booting on the assumption that the adjacent log conforms to the protocol. A protocol for correctness of recovery upon booting is dependent on the specification of an interface between logs, and may be designed differently according to a management policy of the meta cache buffer 612 inside the log.

Figure 8:
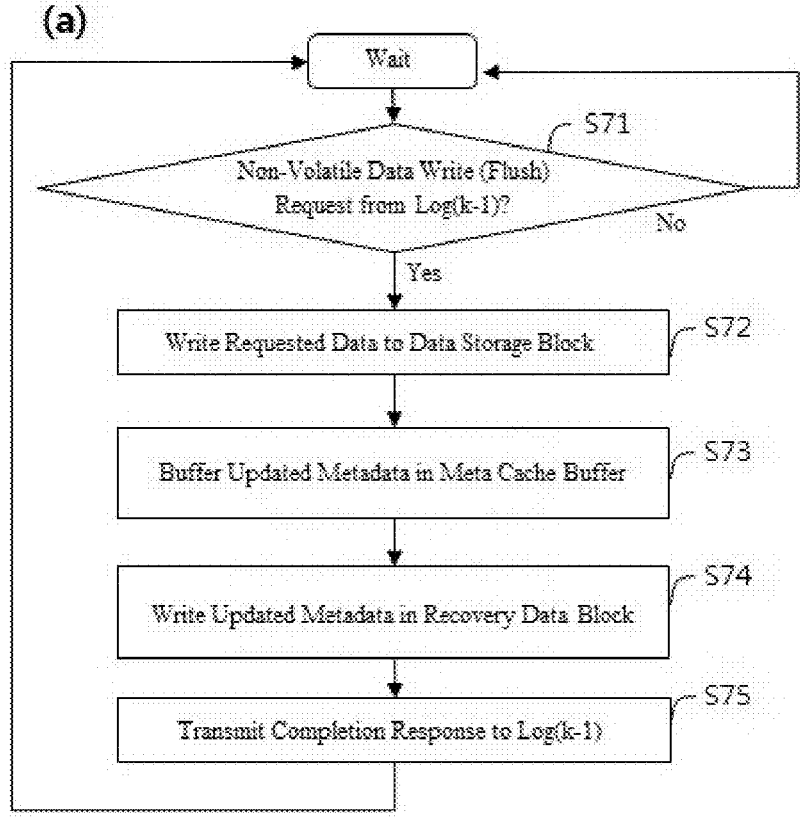
FIG. 8 is a flowchart illustrating a crash recovery operation in time series according to an embodiment of the present invention.
Figure 8:
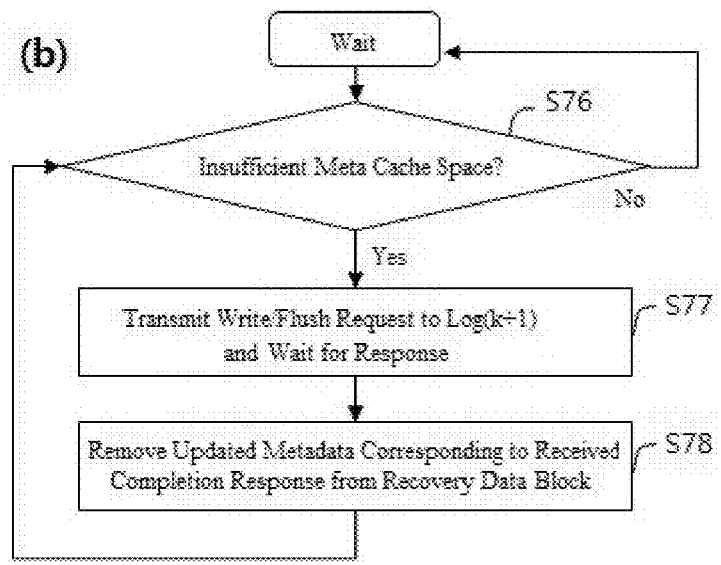

FIG. 8 is a flowchart illustrating a crash recovery protocol that must be conformed during run-time and applied to all logs in a HIL-based flash storage system, according to an embodiment of the present invention.

FIG. 8(*a*) illustrates the first rule of the crash recovery protocol. According to an embodiment of the present invention, the first rule of the crash recovery protocol is to transmit a completion response to a lower-layer log only when recovering metadata of committed data is possible (meaning that metadata is persistently written to a recovery log) in response to a non-volatile write request from Log (k−1). For this purpose, the temporal order of actions illustrated in FIG. 8A should be conformed.

First, the Log(k−1) request processing module 601 determines whether a non-volatile write request (i.e., a flush command) has been received from Log(k−1) (S71). In the presence of the flush command from Log(k−1), the Log(k−1) request processing module 601 should (1) destage data in the data buffer 611 to the storage block 621 (S72) and (2) at the same time, store the resulting updated mapping data in a non-volatile manner (persistently), in order to transmit a completion response to the flush command. This is because if the completion response to the flush command is transmitted while mapping information of flushed data is only in a volatile state, and then power is suddenly turned off, position information about data is lost and it becomes impossible to recover the data confirmed to the lower-layer log.

According to an embodiment of the present invention, the first rule of crash recovery protocol may be enforced by cooperation of three distinct function modules inside a log.

The metadata processing module 604 loads the updated metadata in the meta cache buffer 612 (S73), the crash recovery processing module 605 collects updated mapping information of Log(k) and write the collected mapping information to the recovery data block 622 (S74), and then the Log(k−1) request processing module 601 transmits a completion response to Log(k−1) (S75).

According to another embodiment of the present invention, the first rule of recovery protocol may be enforced in a more straightforward manner, in which non-volatile writing of the updated metadata is directly requested to Log (k+1) and its completion response is waited for before sending completion response to Log (k−1) While this removes the complexity of maintaining updated metadata both in the meta cache and the recovery log, it may be difficult to apply this method to a commercial system due to severe performance degradation.

Consequently, Log (k) may optimize performance of flush operation by allowing redundancy (identical metadata being present both in the recovery data block and in the higher-layer log), which eliminates needs to request and wait the persistent writing of metadata to/from the upper-layer log, in a response to every flush requests from the lower-layer log.

FIG. 8(*b*) illustrates the second rule of the crash recovery protocol. As described before, the recovery data block 622 is a temporary repository for Log(k) metadata. Thus, the data should be removed (or truncated) some time. A time to remove the data is determined based on the second rule of the crash recovery protocol according to an embodiment of the present invention.

More specifically, updated mapping data is maintained in the meta cache buffer 612 of Log(k), without the need for transmitting an immediate flush command to Log(k+1), as described before with reference to FIG. 8A. If the meta cache buffer 612 has insufficient space (S76), the metadata processing module 604 of Log(k) chooses some of updated metadata to evict and requests write/flush of the chosen metadata to higher-layer Log(k+1) (S77). Subsequently, the crash recovery processing module 605 removes updated mapping data for which persistent writing is confirmed from the recovery data block 622 (S78). That is, the second rule of the crash recovery protocol is that updated metadata in a recovery data block is removed only after persistent writing of the updated metadata is confirmed by Log(k+1).

If the first and second rules of the crash recovery protocol according to the embodiment of the present invention are followed, individual logs may execute other tasks independently of each other. Although cooperation is required between processing module in a log to follow the above rules, the modules may operate independently in other aspects.

Figure 9:
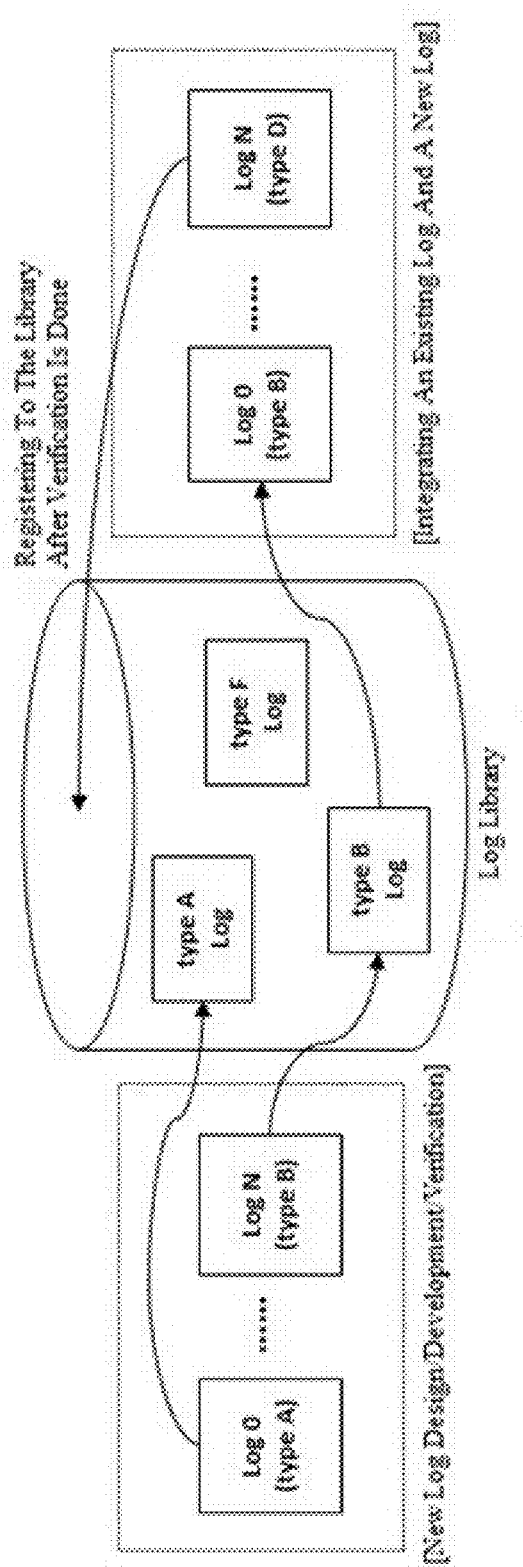
FIG. 9 illustrates an exemplary HIL use model according to an embodiment of the present invention.

FIG. 9 illustrates an exemplary HIL usage model according to an embodiment of the present invention.

As described above, the HIL according to the embodiment of the present invention constructs an FTL by hierarchically composing individual logs that provide a uniform set of interfaces. Therefore, log components which have been completely developed and verified may be registered into a library, and appropriate log components may be retrieved from the library, each time an FTL of a target flash storage system is constructed.

As illustrated in FIG. 9, if several types of logs (with different functional and interface specifications) have been designed/developed/verified completely (type A, type B, and the like), the logs may be registered in a library. For example, if a log of type B having an interface specification compatible with a specific flash memory is completely developed and verified, the type-B log may be registered in the library so that the log may be retrieved from the library and immediately applied in a storage system using that flash memory.

Also, when a flash storage device is constructed, log components classified by the same (interface) type may be retrieved from the library and combined. Herein, the log components may be selected in such a manner that requirements for the performance and resource usage of a target storage system may be satisfied. For example, for a storage system using a specific flash memory, type-B logs compatible with that flash memory may be selected from the library, and when needed, type-D logs may be newly designed, developed, and registered into the library after verification.

Figure 10:
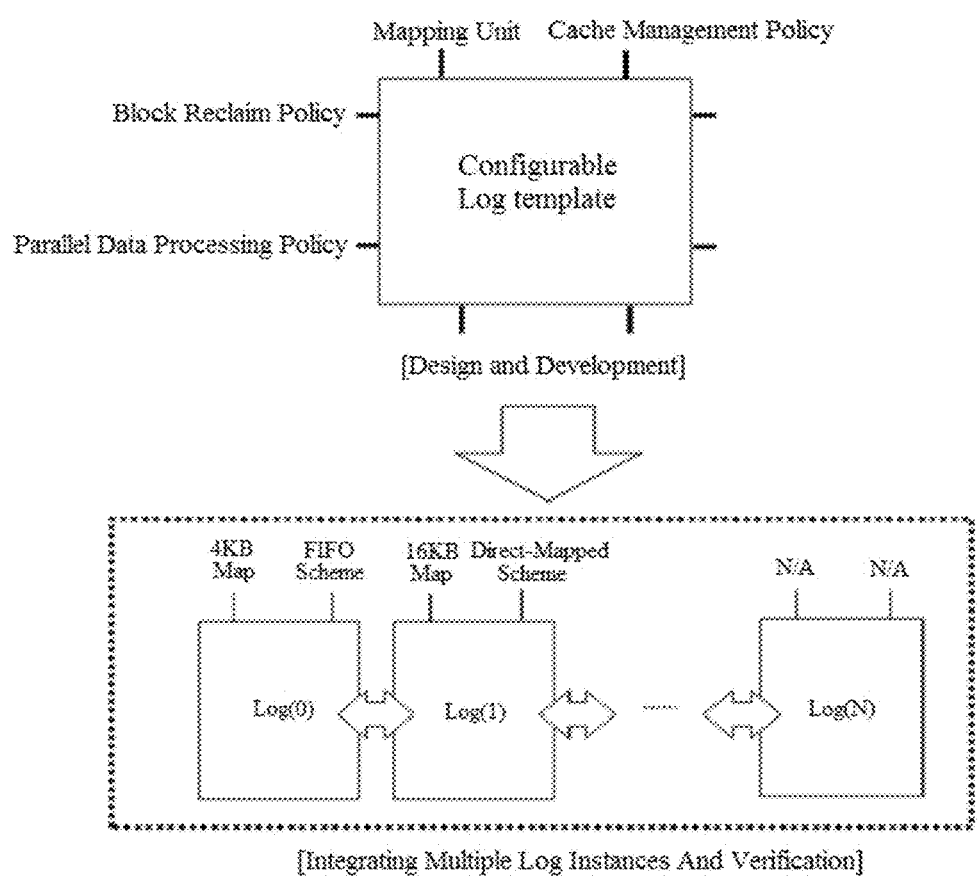
FIG. 10 illustrates another exemplary HIL use model according to an embodiment of the present invention.

FIG. 10 illustrates another exemplary HIL usage model according to an embodiment of the present invention.

According to an embodiment of the present invention, a template model of HIL may be provided. The template model refers to designing and implementing one configurable log template and constructing an FTL by instantiating the log template with different configurations for each layer of log. Therefore it is possible to share one processing resource (program code or logic gates), which is similar in concept with Object Oriented Programming (OOP) in software perspective, and Simultaneous Multi-Threading (SMT) in hardware perspective.

More specifically, in the embodiment of FIG. 10, a log template may be designed and developed to be configurable in terms of mapping unit, cache management policy, block reclaim policy, and parallel data processing policy. According to an embodiment of the present invention, an FTL structure may be designed by instantiating configurable log template in various manners.

For example, an FTL is composed with log instances for which various mapping units and various cache management policies are configured, by way of example, in the FTL structure according to the embodiment of FIG. 10. More specifically, a FTL may be configured so that Log(0) has a 4-KB mapping unit and FIFO as a cache management policy, whereas Log(1) has a 16-KB mapping unit and a direct-mapped cache management policy.

The FTL structure to which the afore-described HIL according to the embodiment of the present invention is applied offers the advantages of i) reusability, ii) testability, and iii) extensibility.

More specifically, in regard to reusability, since it is possible to build a target storage device by reusing a verified set of logs, time and cost taken to build a storage solution can be reduced remarkably.

In regard to testability, the verification of a whole storage system is much simplified, since multiple log instances comprising the storage system, communicate with adjacent logs and memory modules through a uniform set of interfaces, and conform to an identical crash recovery protocol.

Finally in regard to extensibility, because a large-capacity storage device system is readily built by hierarchically connecting log instances configured from one log template and easily tuned to available system resource (e.g. volatile memory), product lineup can be diversified greatly.

The foregoing embodiments of the present invention may be achieved by hardware, software, and/or a combination thereof. The apparatuses, methods, and components according to embodiments of the present invention may be achieved by one or more general-purpose or special-purpose computers, such as processors, controllers, Arithmetic Logic Units (ALUs), digital signal processors, microcomputers, Field Programmable Gate Arrays (FPGAs), Programmable Logic Units (PLUs), microprocessors, or other devices capable of executing instructions and responding. A processing device may access, store, manipulate, process, and generate data in response to software execution. While it is described for the convenience of understanding that a single processing device is used, those skilled in the art will understand that a processing device may include a plurality of processing elements and/or a plurality of types of processing elements. For example, the processing device may include a plurality of processors, or one processor and one controller. Also, another processing configuration such as a parallel processor is available.

Software may include computer program, code, instructions, or a combination of one or more of them. The software may configure a processing device, for an intended operation or command the processing device independently or collectively. Software and/or data may be embodied permanently or temporarily in a specific type of machine, component, physical device, virtual component, computer storage medium or device, or transmission signal waves, in order to be interpreted by a processing device or provide a command or data to the processing device. Software may be distributed across computer systems connected through a network, and stored or executed in a distributed manner. Software and data may be stored in one or more computer-readable recording media.

The methods according to the embodiments may be implemented as commands stored in a computer-readable storage medium, in the form of program instructions executable by various computer means. The computer-readable storage medium may include program instructions, data files, and data structures alone or in combination. The program instructions recorded on the medium may be designed or configured specially for the embodiments or known and available to those skilled in the art of computer software. The computer-readable medium may include hard disk, floppy disk, magnetic media (for example, magnetic tape), optical media (for example, Compact Disc Read-Only Memory (CD-ROM)), Digital Versatile Disc (DVD), magneto-optical media (for example, floptical disk), hardware devices specialized to store and execute program instructions (for example, ROM, RAM, or flash memory)), and the like. Program instructions may include machine language code that are produced by a compiler or high-level language code that may be executed by a computer using an interpreter. The functionalities of hardware discussed above may be implemented as one or more software modules, and vice versa in order to perform an operation according to various embodiments.

1. A Flash Translation Layer (FTL) structure including mapping information for storing data, comprising: a plurality of hierarchical data groups including a zeroth-layer host data group, and first-layer to $n^{th}$-layer metadata groups; and zeroth to $n^{th}$ logs configured in a hierarchical structure in correspondence with the respective hierarchical data groups, for processing data of the corresponding data groups, wherein a $k^{th}$ log ($0 \le k \le n$) provides an interface to volatile memory resources dividedly allocated to the $k^{th}$ log, an interface to non-volatile memory resources dividedly allocated to the $k^{th}$ log, and an interface to at least one of $(k-1)^{th}$ and $(k+1)^{th}$ logs.

2. The FTL structure according to clause 1, wherein the interface to the at least one of the $(k-1)^{th}$ and $(k+1)^{th}$ logs is a linear address space readable, writable, and bytewise-accessible.

3. The FTL structure according to clause 1, wherein the interface to the at least one of the $(k-1)^{th}$ and $(k+1)^{th}$ logs includes a read command, a write command, and a flush command, and wherein the read command requests reading of as many bytes as a byte count, starting at a start address of a log Identifier (ID) address space of the $k^{th}$ log and transmission of the read bytes to a data buffer address of an invoker, the write command requests transmission of data from the data buffer address and writing of as many bytes as a byte count, starting at the start address of the log ID address space, and the flush command requests persistent writing of the bytes written in the log ID address space to a non-volatile memory.

4. The FTL structure according to clause 1, wherein the zeroth log provides an interface to a host system through an interface glue, and the interface glue corrects mismatch between a sector-based address space and a byte-based address space.

5. The FTL structure according to claim 1, wherein the $k^{th}$ log comprises: a metadata processing module for performing referencing and eviction of a meta cache of the $k^{th}$ log; and a crash recovery processing module for performing log write processing for recovery after power turn-off and data recovery during booting.

6. The FTL structure according to clause 5, wherein Log(k−1) request processing module receives a non-volatile data write request from the $(k−1)^{th}$ log (if k=0, from the host system), writes requested data in a non-volatile manner, and the crash recovery module adds updated metadata to a recovery log, updates the recovery log in a non-volatile manner, and finally Log(k−1) request processing module provides a completion response to the $(k−1)^{th}$ log, and wherein if a meta cache space corresponding to the $k^{th}$ log is insufficient, Log(k) metadata processing module transmits write and flush request to the $(k+1)^{th}$ log, and crash recovery module removes the updated metadata from the recovery log after receiving a completion response, and updates the recovery log in a non-volatile manner.

7. The FTL structure according to clause 6, wherein if k=n, the crash recovery processing module does not transmit the write and flush request to the $(k+1)^{th}$ log, and snapshots whole data corresponding to the $n^{th}$ log to a check-point area.

8. The FTL structure according to clause 5, wherein the $k^{th}$ log further comprises: a $(k−1)^{th}$ log request processing module for receiving a read, write, or flush request from the $(k−1)^{th}$ log (if k=0, from the host system), and processing the received request; +a data copy-back module for performing data copy-back for block reclaim, wear leveling and refresh write; and a NAND request scheduling module for performing NAND requests scheduling in order to optimize bandwidth and latency.

9. The FTL structure according to clause 1, wherein as a mapping unit increases in size, n decreases, and as the mapping unit decreases in size, n increases.

10. The FTL structure according to clause 1, wherein the logs commonly have the same data processing function for writing data to the dividedly allocated non-volatile memory block resources and updating metadata.

11. The FTL structure according to clause 1, wherein the zeroth log corresponds to the zeroth-layer host data group, and the first to $n^{th}$ logs correspond to the first-layer to $n^{th}$-layer metadata groups, respectively.

12. The FTL structure according to clause 1, wherein if k=0, the interface to the at least one of the $(k−1)^{th}$ and $(k+1)^{th}$ logs are interfaces with a host system and the first log, and if k=n, the interface to the at least one of the $(k−1)^{th}$ and $(k+1)^{th}$ logs is an interface to an $(n−1)^{th}$ log.

13. The FTL structure according to clause 1, wherein a verified log among the logs is applicable to another FTL.

14. The FTL structure according to clause 1, wherein the FTL is capable of formally proving the correctness of recovery protocol.

15. A system for designing a Flash Translation Layer (FTL) including mapping information for storing data, the system comprising: a log developer for generating logs in a hierarchical structure in correspondence with respective hierarchical data groups of the FTL, for processing data of the corresponding data groups, a verifier for verifying the logs; a register for generating log components for logs verified by the verifier and registering the generated log components to a library; and a designer for designing the FTL by combining log components satisfying required conditions related to system performance and resource use amount for a target storage system from among the log components registered to the library, wherein each of the logs provides an interface to volatile memory resources dividedly allocated to the log, an interface to non-volatile memory resources dividedly allocated to the log, and an interface to at least one of a lower-layer log and a higher-layer log.

16. The system according to clause 15, wherein each of the log components includes configurable properties, and the log developer develops one or more other logs by instantiating one log template and changing the configurable properties of the log template.

17. A method for designing a Flash Translation Layer (FTL) structure including mapping information for storing data, the method comprising: generating a plurality of hierarchical data groups including a zeroth-layer host data group, and first-layer to $n^{th}$-layer metadata groups; and designing zeroth to $n^{th}$ logs in a hierarchical structure in correspondence with the respective hierarchical data groups, for processing data of the corresponding data groups, wherein a $k^{th}$ log ($0 \le k \le n$) provides an interface to volatile memory resources dividedly allocated to the $k^{th}$ log, an interface to non-volatile memory resources dividedly allocated to the $k^{th}$ log, and an interface to at least one of $(k−1)^{th}$ and $(k+1)^{th}$ logs.

18. The method according to clause 17, wherein the interface to the at least one of the $(k−1)^{th}$ and $(k+1)^{th}$ logs is a linear address space readable, writable, and bytewise-accessible.

19. The method according to clause 17, wherein the interface to the at least one of the $(k−1)^{th}$ and $(k+1)^{th}$ logs includes a read command, a write command, and a flush command, and wherein the read command requests reading of as many bytes as a byte count, starting at a start address of a log Identifier (ID) address space of the $k^{th}$ log and transmission of the read bytes to a data buffer address of an invoker, the write command requests transmission of data from the data buffer address and writing of as many bytes as a byte count, starting at the start address of the log ID address space, and the flush command requests persistent writing of the bytes written in the log ID address space to a non-volatile memory.

20. The method according to clause 17, wherein the zeroth log provides an interface to a host system through an interface glue, and the interface glue corrects mismatch between a sector-based address space and a byte-based address space.

21. The method according to clause 17, wherein the designing of zeroth to $n^{th}$ logs comprises: performing a metadata processing by performing referencing and eviction of a meta cache of the $k^{th}$ log; and performing a crash recovery process by performing log write processing for recovery after power turn-off and data recovery during booting.

22. The method according to clause 21, wherein the performing of a crash recovery comprises: receiving a non-volatile data write request from the $(k-1)^{th}$ log (if k=0, from the host system), writing requested data in a non-volatile manner, adding updated metadata to a recovery log, updating the recovery log in a non-volatile manner, and providing a completion response to the $(k-1)^{th}$ log, and if a meta cache space corresponding to the $k^{th}$ log is insufficient, transmitting write and flush request to the $(k+1)^{th}$ log, removing the updated metadata from the recovery log after receiving a completion response, and updating the recovery log in a non-volatile manner.

23. The method according to clause 22, where the performing of a crash recovery further comprises, if k=n, snapshotting whole data corresponding to the $n^{th}$ log to a check-point area without transmitting the write and flush request to the $(k+1)^{th}$ log.

24. The method according to clause 21, wherein the designing of zeroth to $n^{th}$ logs further comprises: receiving a read, write, or flush request from the $(k-1)^{th}$ log (if k=0, from the host system), and processing the received request by the $k^{th}$ log; performing data copy-back processing for block reclaim, wear-leveling and refresh write by the $k^{th}$ log; and performing NAND request scheduling for optimizing performance by the $k^{th}$ log.

25. The method according to clause 17, wherein as a mapping unit increases in size, n decreases, and as the mapping unit decreases in size, n increases.

26. The method according to clause 17, wherein the logs commonly have the same data processing function for writing data to the dividedly allocated non-volatile memory block resources and updating metadata.

27. The method according to clause 17, wherein the zeroth log corresponds to the zeroth-layer host data group, and the first to $n^{th}$ logs correspond to the first-layer to $n^{th}$-layer metadata groups, respectively.

28. The method according to clause 17, wherein if k=0, the interface to the at least one of the $(k-1)^{th}$ and $(k+1)^{th}$ logs are interfaces with a host system and the first log, and if k=n, the interface to the at least one of the $(k-1)^{th}$ and $(k+1)^{th}$ logs is an interface to an $(n-1)^{th}$ log.

29. The method according to clause 17, wherein a verified log among the logs is applicable to another FTL.

30. The method according to clause 17, wherein the FTL is capable of formally proving the correctness of recovery protocol.

31. A method for designing a Flash Translation Layer (FTL) including mapping information for storing data, the system comprising: developing logs by generating the logs in a hierarchical structure in correspondence with respective hierarchical data groups of the FTL, for processing data of the corresponding data groups, verifying the logs; generating log components for logs verified by the verifier and registering the generated log components to a library; and designing the FTL by combining log components satisfying required conditions related to system performance and resource use amount for a target storage system from among the log components registered to the library, wherein each of the logs provides an interface to volatile memory resources dividedly allocated to the log, an interface to non-volatile memory resources dividedly allocated to the log, and an interface to at least one of a lower-layer log and a higher-layer log.

32. The method according to clause 31, wherein each of the log components includes configurable properties and the development of logs comprises developing one or more other logs by instantiating one log template and changing the configurable properties of the log template.

33. A computer-readable medium storing a program for performing the method according to any of clauses 17 to 32.

While the embodiments have been described above with reference to the attached drawings, those skilled in the art will appreciate that many modifications and variations can be made to the present disclosure. For example, even though the described techniques are performed in a different order from an order described above, and/or the described components such as systems, structures, devices, and circuits are combined in a different manner from a manner described above, or the components are replaced with other components or their equivalents, appropriate results can be achieved. Therefore, other embodiments and equivalents to the appended claims come within the scope of the claims.

What is claimed is:

1. A Flash Translation Layer (FTL) structure including mapping information for storing data, comprising:
    a plurality of hierarchical data groups including a zeroth-layer host data group, and first-layer to $n^{th}$-layer metadata groups; and
    zeroth to $n^{th}$ logs configured in a hierarchical structure in correspondence with the respective hierarchical data groups, for processing data of the corresponding data groups,
    wherein a $k^{th}$ log ($0 \leq k \leq n$) provides an interface to volatile memory resources dividedly allocated to the $k^{th}$ log, an interface to non-volatile memory resources dividedly allocated to the $k^{th}$ log, and an interface to at least one of $(k-1)^{th}$ and $(k+1)^{th}$ logs.

2. The FTL structure according to claim 1, wherein the interface to the at least one of the $(k-1)^{th}$ and $(k+1)^{th}$ logs is a linear address space readable, writable, and bytewise-accessible.

3. The FTL structure according to claim 1, wherein the interface to the at least one of the $(k-1)^{th}$ and $(k+1)^{th}$ logs includes a read command, a write command, and a flush command, and
    wherein the read command requests reading of as many bytes as a byte count, starting at a start address of a log Identifier (ID) address space of the $k^{th}$ log and transmission of the read bytes to a data buffer address of an invoker, the write command requests transmission of data from the data buffer address and writing of as many bytes as a byte count, starting at the start address of the log ID address space, and the flush command requests persistent writing of the bytes written in the log ID address space to a non-volatile memory.

4. The FTL structure according to claim 1, wherein the zeroth log provides an interface to a host system through an interface glue, and the interface glue corrects mismatch between a sector-based address space and a byte-based address space.

5. The FTL structure according to claim 1, wherein the $k^{th}$ log comprises:
    a metadata processing module for performing referencing and eviction of a meta cache of the $k^{th}$ log; and
    a crash recovery processing module for performing log write processing for recovery after power turn-off and data recovery during booting.

6. The FTL structure according to claim 5, wherein Log(k-1) request processing module receives a non-volatile data write request from the $(k-1)^{th}$ log (if k=0, from the host system), writes requested data in a non-volatile manner, and the crash recovery module adds updated metadata to a recovery log, updates the recovery log in a non-volatile manner, and finally Log(k−1) request processing module provides a completion response to the $(k-1)^{th}$ log, and wherein if a meta cache space corresponding to the $k^{th}$ log is insufficient, Log(k) metadata processing module transmits write and flush request to the $(k+1)^{th}$ log, and crash recovery module removes the updated metadata from the recovery log after receiving a completion response, and updates the recovery log in a non-volatile manner.

7. The FTL structure according to claim 6, wherein if k=n, the crash recovery processing module does not transmit the write and flush request to the $(k+1)^{th}$ log, and snapshots whole data corresponding to the $n^{th}$ log to a check-point area.

8. The FTL structure according to claim 5, wherein the $k^{th}$ log further comprises:
- a $(k-1)^{th}$ log request processing module for receiving a read, write, or flush request from the $(k-1)^{th}$ log (if k=0, from the host system), and processing the received request;
- a data copy-back module for performing data copy-back for block reclaim, wear leveling and refresh write; and
- a NAND request scheduling module for performing NAND requests scheduling in order to optimize bandwidth and latency.

9. The FTL structure according to claim 1, wherein as a mapping unit increases in size, n decreases, and as the mapping unit decreases in size, n increases.

10. The FTL structure according to claim 1, wherein the logs commonly have the same data processing function for writing data to the dividedly allocated non-volatile memory block resources and updating metadata.

11. The FTL structure according to claim 1, wherein the zeroth log corresponds to the zeroth-layer host data group, and the first to $n^{th}$ logs correspond to the first-layer to $n^{th}$-layer metadata groups, respectively.

12. The FTL structure according to claim 1, wherein if k=0, the interface to the at least one of the $(k-1)^{th}$ and $(k+1)^{th}$ logs are interfaces with a host system and the first log, and if k=n, the interface to the at least one of the $(k-1)^{th}$ and $(k+1)^{th}$ logs is an interface to an $(n-1)^{th}$ log.

13. The FTL structure according to claim 1, wherein a verified log among the logs is applicable to another FTL.

14. The FTL structure according to claim 1, wherein the FTL is capable of formally proving the correctness of recovery protocol.

* * * * *